July 1, 1930. J. A. RICE 1,769,275
METHOD OF MAKING POROUS CONCRETE BY FORCING AIR INTO CEMENT SLURRIES
Filed Oct. 26, 1926  2 Sheets-Sheet 2

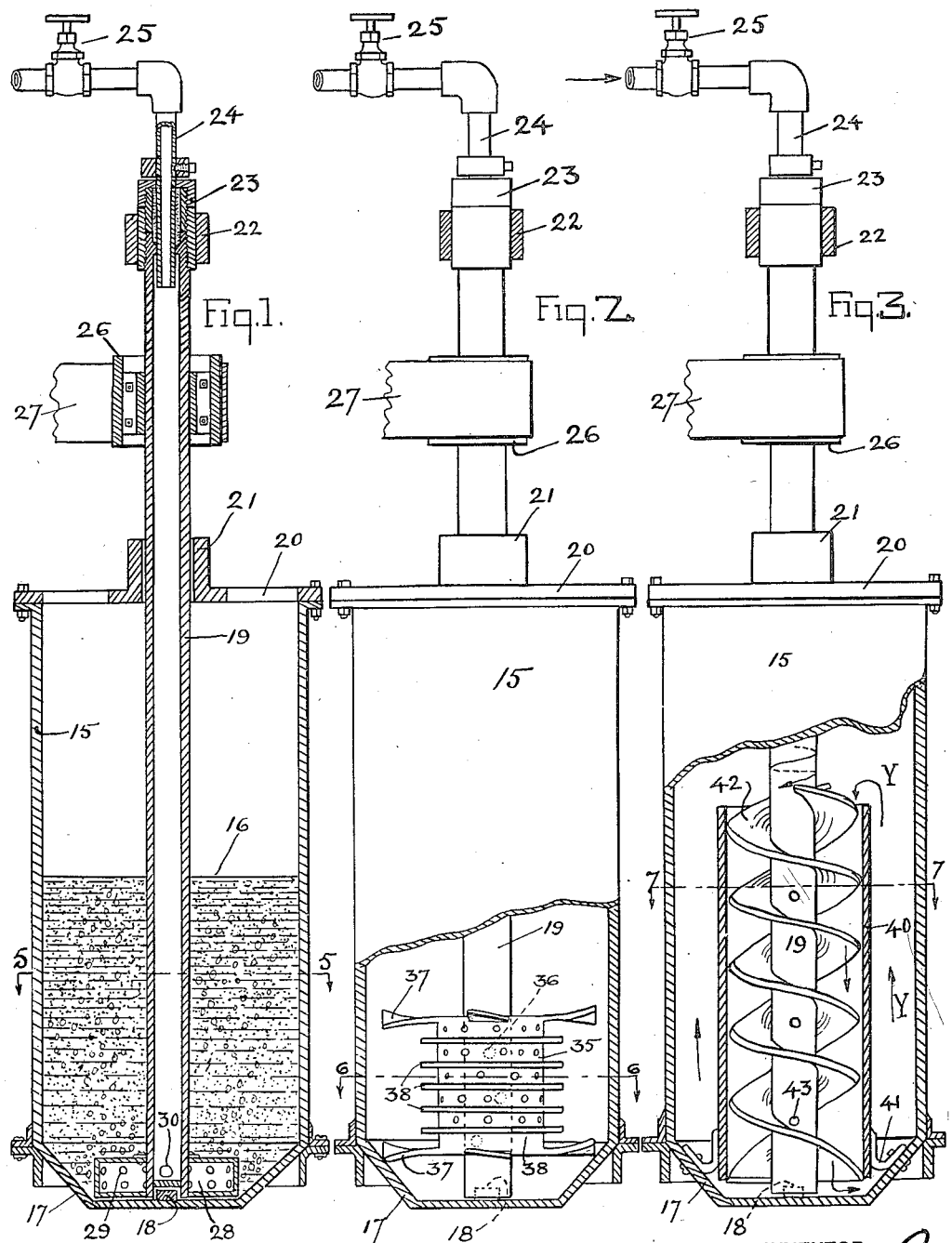

Inventor
John A. Rice
Attorney

Patented July 1, 1930

1,769,275

UNITED STATES PATENT OFFICE

JOHN A. RICE, OF BERKELEY, CALIFORNIA, ASSIGNOR TO THE BUBBLESTONE COMPANY, OF PITTSBURGH, PENNSYLVANIA, A CORPORATION OF PENNSYLVANIA

METHOD OF MAKING POROUS CONCRETE BY FORCING AIR INTO CEMENT SLURRIES

Application filed October 26, 1926. Serial No. 144,391.

The present invention relates to a method of producing cellular or porous concrete, which consists in aerating a plastic mixture such as cement slurry of any kind and mixing the same with a frothing compound.

The slurry or plastic mixture may be made from Portland cement, gypsum, plaster, clay, or any other cement that may be suitable to form the bond between the particles of an aggregate such as sand which is mixed in desired proportions together with water.

The apparatus is used for the purpose of injecting bubbles of air or other gas into a cement slurry which contains a foaming compound such that the bubbles will thereupon remain in suspension, and thereafter form the structure of cellular concrete upon hardening of the cement.

In the accompanying drawings several simple forms of apparatus have been shown for carrying out the invention, and Figure 1 is a vertical axial section of one embodiment of the apparatus;

Figure 2 is an elevation, partly in section of a modified form of the invention;

Figure 3 is a similar elevation and partial section of a second modification of the apparatus;

Figure 4:
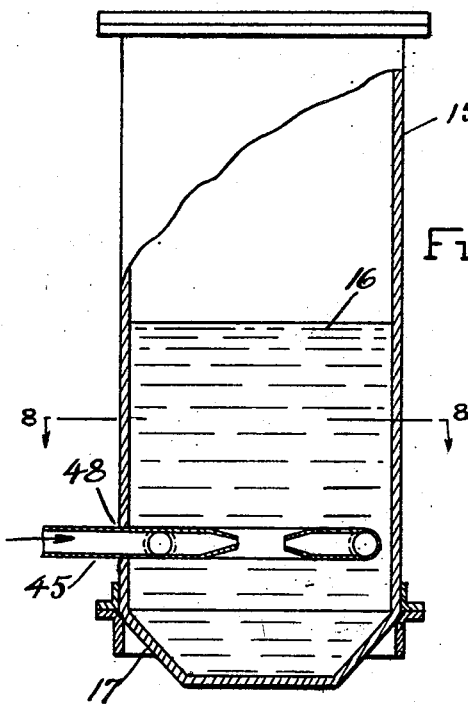
Figure 5:
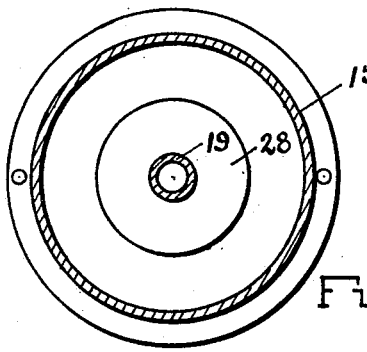
Figure 6:
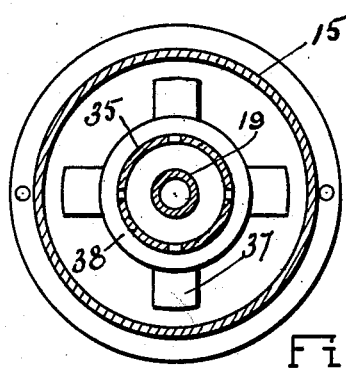
Figure 8:
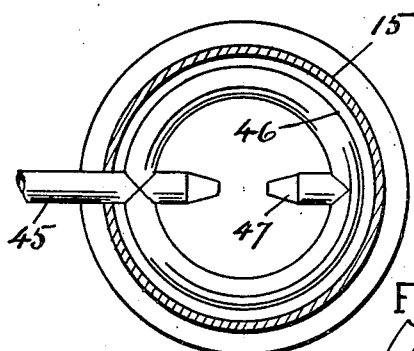
Figure 7:
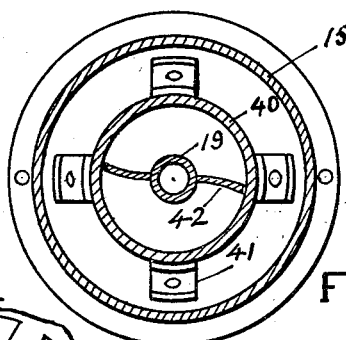
Figure 9:
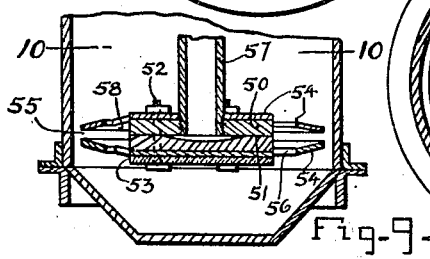
Figure 10:
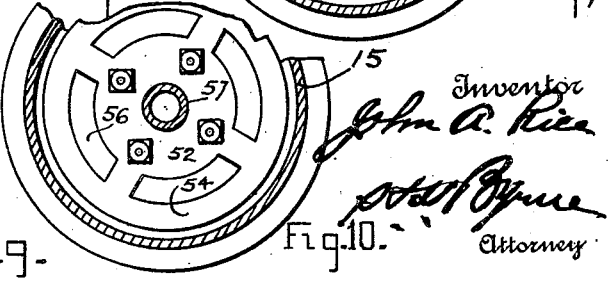

Figure 4, still another modification shown in fragmentary section of the apparatus;

Figure 5 is a horizontal section along line 5—5 of Figure 1;

Figure 6 is a similar section along line 6—6 of Figure 2;

Figure 7 is a horizontal section along line 7—7 of Figure 3;

Figure 8, a horizontal section along line 8—8 of Figure 4;

Figure 9 is a fragmentary vertical section or further modification of the apparatus; and Figure 10, a fragmentary horizontal section along line 10—10 of Figure 9.

Referring now particularly to Figures 1 and 5 numeral 15 denotes a cylindrical vessel or container for the mixed slurry and frothing compound 16 of which the vessel is partly filled. The bottom 17 is preferably made in the shape of an inverted conic frustum with a central thrust bearing or stand 18 for the hollow shaft 19 which extends upwardly through the top cover 20 of the vessel where it is supported by a guide sleeve 21. A stationary bearing 22 grips the upper end of the tubular shaft 19 which with a swivel joint as at 23 engages the end of the pipe 24 connected with a source of compressed air the supply of which is regulated by the valve 25.

Below the bearing 22 a pulley 26 is secured on the hollow shaft 19, which can be set in rotation by a belt 27 from any suitable kind of motor.

Integral with the shaft 19 or rigidly secured at its lower end is provided a drum or closed cam 28 with perforated sides as at 29. Within this drum the tubular shaft 19 has one or more openings or ports 30 for passing the compressed air from the shaft to the drum and from the latter into the frothed slurry 16.

In Figures 2, 3, 6 and 7 the reference characters 15 to 27 inclusive represent the identical parts described in connection with Figures 1 and 5.

In Figures 2 and 6 a larger, perforated drum 35 is attached to the lower end of the hollow shaft 19 which as before communicates with the interior of the drum through ports 36. At the closed top and bottom of the drum radial vanes or propeller blades 37 are provided to cause a whirling of the slurry 16 when the shaft 19 with the drum 35 is rotated. A series of annular flanges 38 are furnished on the exterior of the drum at regular intervals for guiding the air bubbles in radial direction when escaping from the drum.

In Figures 3 and 7 the drum has been replaced by a stationary hollow cylinder or jacket 40 which is open at both ends and secured as at 41 to the conical bottom 17 of the vessel 15. The hollow cylinder reaches about two-thirds up in the vessel and is raised slightly from its bottom. Within this cylinder a helical blade or screw 42 is secured around the hollow shaft 19 which is adapted to be revolved with the blade to cause a downward flow of current within and an upward flow outside of the hollow cylinder or jacket 40 as indicated by the arrows (Y). Air from the hollow shaft enters the hollow cylinder through ports 43.

In Figures 4 and 8 still another modification is illustrated with parts of the same reference characters identical with those in the above description. The hollow air shaft 19 has here been replaced by the air pipe 45 which leads from an air compressor. This pipe entering through the side of the vessel as at 48, opens into an annular tube 46 deposited near the bottom of the vessel. Two or more spouts or nozzles 47 are provided on the tube 46 and directed to or slightly off the axis of the vessel. In the latter case not only a stirring motion but also a whirling one will be caused by the air jets from the nozzles 47 in the mixture contained in the vessel.

The frothing compound may consist of any suitable mixture of colloidal substances which will cause the cement water mixture, or slurry to retain the air bubbles in suspension. In other words, the frothing compound causes the cement water mixture or slurry to be of such a consistency that small bubbles will not break as they would in the absence of this frothing compound.

A suitable frothing compound may be made as follows:

| | Parts |
|---|---|
| Ground casein | 100 |
| Water | 600 |
| Calcium hydrate | 25 |

The casein is first soaked in the water until thoroughly swelled, whereupon the calcium hydrate is added while stirring. At frequent intervals the mixture has then to be gently stirred until the casein is thoroughly dissolved.

For the purpose of preventing decomposition of this mixture, two parts of arsenious acid or a soluble salt of arsenic may be added.

Upon standing for a few hours the compound will thicken to a jelly, but after standing from ten (10) to twenty (20) days it will again become liquid.

As soon as the compound has liquefied as just explained, seven parts of benzoic acid in a dry powdered state are added under gentle stirring for half an hour at intervals when it will dissolve.

The above described mixture may be used successfully, as it is, as a frothing compound for cement slurry but it is advisable to add the following ingredients for reasons that will be enumerated below.

| | Parts |
|---|---|
| Boracic acid | 2 |
| Colloidal tungstic acid in solution | 2 |
| Beta naphthol, crystals | 1 |
| Diatomaceous earth, finely ground and dissolved in water | 30 |

These ingredients are to be thoroughly mixed and stirred and preferably passed through a colloidal mill before adding to the frothing compound.

The diatomaceous earth solution to be prepared in advance consists of:

| | Parts |
|---|---|
| Diatomaceous earth, ground | 1 |
| Water | 8 |

The reasons for adding these ingredients are first, for the preservation of the compound; second, for increasing the frothing qualities, and third, for the purpose of causing the cement to harden more satisfactorily during the subsequent curing process after the operation described in this specification.

In accordance with the above given recipe, the complete list and proportions of the ingredients for the frothing compound is as follows:

| | Parts |
|---|---|
| Casein | 100 |
| Water | 600 |
| Calcium hydrate | 25 |
| Arsenious acid | 2 |
| Benzoic acid | 7 |
| Boracic acid | 2 |
| Colloidal tungstic acid | 2 |
| Beta naphthol, crystals | 1 |
| Diatomaceous earth solution | 30 |
| | 769 |

From the frothing compound a frothing solution is prepared as follows:

| | Parts |
|---|---|
| Frothing compound | 1 |
| Water | 50 |

In preparing the cellular concrete the following proportions are used:

| | Parts |
|---|---|
| Cement slurry | 100 |
| Frothing solution | 60 |

The slurry may contain sand or other aggregate if so desired.

The operation of the mixing apparatus is as follows:

Slurry and frothing solution in the proportions given above are placed in the container or vessel 15 to a suitable height and at least enough to submerge the orifices for the delivery of compressed air. In the case of Figures 1, 2 and 3 the stirring device is next set in motion through the belt 27 and pulley 26 and then pressure applied by opening valve 25, when compressed air or other gas passes down the hollow shaft 19 and is forced out in radial direction through the small perforations 29 of the drum 28 into the slurry and frothing solution, in the case of Figures 1 and 5. The slurry will in this manner become aerated and gradually increase in volume as the process is continued. When sufficient air or gas has been incorporated into the slurry the product may be transferred to suitable molds and permitted to set and harden.

The procedure in the case of the apparatus shown in Figures 2 and 6 is practically the same with the difference that, when the shaft 19 with the drum 35 is rotated, the air or gas bubbles are thrown out still more in radial direction as guided by the flanges 38, whereupon a whirling motion is produced in the slurry by the moving vanes 37.

When the screw 42 is rotated by the shaft 19 in Figures 3 and 7 and air or gas enters through openings 43 in the shaft, the contents of the vessel will then circulate in the direction indicated by the arrows Y, that is to say, downwardly through the hollow cylinder or jacket 40, under the bottom edge thereof and then upwardly between the side walls of the cylinder or jacket 40 and the vessel 15 and lastly over the top edge of the cylinder in a continuous current as long as the screw 42 is rotated.

The action is somewhat different in the apparatus illustrated in Figures 4 and 8, where no mechanical stirring is resorted to. Instead, when communication from a compressor is opened through the pipe 45, jets of air or gas are forced into the slurry and frothing solution 16 through the nozzles or spouts 47.

The apparatus in Figures 9 and 10 consists of two discs or plates of metal or other suitable material 50, ground to a close fit at the surfaces 51. These plates are held in contact by bolts 52 which pass through and bind the thick rubber sheet 53. On the outside of each plate 50 is shown a sheet metal plate 54, held in place by the bolts 52 and extending beyond the periphery of said plates 50, being bent almost together at their periphery 55. Slots 56 are cut in the plates 54. A pipe 57 is provided to conduct compressed air or other gas downwardly to the ground surfaces 51.

This apparatus may, as before, be placed under the surface of the prepared cement slurry in the container 15 where the cellular concrete is to be mixed. For demonstration purposes an ordinary water pail may be used. The slurry should fill the pail approximately half full. Compressed air is admitted to the pipe 57 and the nuts of the bolts 52 adjusted so that the gas is ejected in the form of a sheet, from the ground joint 51 at the periphery of the plates 50, the rubber sheet 53 acting as an elastic cushion to keep the disks or plates 50 bound together with a constant pressure, but allowing gas to escape between them when the pressure of the compressed gas is sufficient. The forcibly ejected air or other gas will pass through the space 58 and mix with slurry, and drive the mixed gas and slurry through the slot at 55, thoroughly mixing the same and causing the air bubbles to separate one from another and to be of small size.

Slurry will flow in through the slots 56 replacing the material forced through the aperture 55.

The apparatus should be moved about so as to stir the contents of the pail, rendering the same homogeneous.

The contents of the pail will increase in bulk as air is forced into the slurry, the foamy nature of the material will cause it to retain the air bubbles in suspension, and when completed, the batch of cellular concrete may be poured into a mold and allowed to set and harden.

When commercial quantities of cellular concrete are to be made, this apparatus may be placed in the mixing machine used or container 15, under the surface of the slurry in a position where its presence will not interfere with the mixing blades of the machine, and its operation will be the same as when used in the pail.

Larger sized apparatus may be properly used in large machines and it is not necessary that the plates 50 between which the air is forced, be circular, or of any particular shape or form. Any convenient shape and size will serve. In large machines a rectangular shape will be best, as less room will be required for the same.

It is to be understood that the invention as here disclosed is not limited to the method disclosed and details of construction shown and these may be varied widely without departing from the spirit of the invention as defined by the claims.

I claim:

1. A method of manufacturing porous concrete consisting in first preparing a cement slurry; second, preparing separately a frothing compound; third, mixing together the slurry and the frothing compound in proportions of 100 to 60; fourth, forcing a gas into the mixture, and, lastly, pouring the mixture into suitable molds to set and harden; the frothing compound comprising casein, water, and calcium hydrate.

2. A method of manufacturing porous concrete consisting in first preparing a cement slurry; second, preparing separately a frothing compound; third, mixing together the slurry and the frothing compound in proportions of 100 to 60; fourth, forcing a gas into the mixture, and, lastly, pouring the mixture into suitable molds to set and harden; the frothing compound comprising casein, water, calcium, hydrate, arsenious acid, and benzoic acid.

3. A method of manufacturing porous concrete consisting in first preparing a cement slurry; second, preparing separately a frothing compound; third, mixing together the slurry and the frothing compound in proportions of 100 to 60; fourth, forcing a gas into the mixture, and, lastly, pouring the mixture into suitable molds to set and harden; the frothing compound comprising casein, water, and calcium hydrate in the weight proportions of 100, 600 and 25, respectively, and in the order named.

4. A method of manufacturing porous concrete consisting in first preparing a cement slurry; second, preparing separately a frothing compound; third, mixing together the slurry and the frothing compound in proportions of 100 to 60; fourth, forcing a gas into the mixture, and, lastly, pouring the mixture into suitable molds to set and harden; the frothing compound comprising casein, water, calcium hydrate, arsenious acid, and benzoic acid in the weight proportions of 100, 600, 25, 2 and 7 parts respectively and in the order named.

5. A method of manufacturing porous concrete consisting in first preparing a cement slurry; second, preparing separately a frothing compound; third, mixing together the slurry and the frothing compound in proportions of 100 to 60; fourth, forcing a gas into the mixture, and, lastly, pouring the mixture into suitable molds to set and harden; the frothing compound comprising casein, water, calcium hydrate, arsenious acid, benzoic acid, boracic acid, colloidal tungstic acid, crystals of beta naphthol and diatomaceous earth solution.

6. A method of manufacturing porous concrete consisting in first preparing a cement slurry; second, preparing separately a frothing compound; third, mixing together the slurry and the frothing compound in proportions of 100 to 60; fourth, forcing a gas into the mixture, and, lastly, pouring the mixture into suitable molds to set and harden; the frothing compound comprising casein, water, calcium hydrate, arsenious acid, benzoic acid, boracic acid, colloidal tungstic acid, crystals of beta naphthol and diatomaceous earth solution in the weight proportions of 100, 600, 25, 2, 7, 2, 2, 1 and 30 respectively.

7. A method of manufacturing porous concrete consisting in first preparing a cement slurry; second, preparing separately a frothing compound; third, mixing together the slurry and the frothing compound in proportions of 100 to 60; fourth, forcing a gas into the mixture, and, lastly, pouring the mixture into suitable molds to set and harden; the frothing compound comprising casein, water, and calcium hydrate in the weight proportions of 100, 600 and 25 respectively and in the order named; the casein being first soaked in the water until thoroughly swelled, when the calcium hydrate is added and the mixture gently stirred until complete solution is obtained.

8. A method of manufacturing porous concrete consisting in first preparing a cement slurry; second, preparing separately a frothing compound; third, mixing together the slurry and the frothing compound in proportions of 100 to 60; fourth, forcing a gas into the mixture, and, lastly, pouring the mixture into suitable molds to set and harden; the frothing compound comprising casein, water, calcium hydrate, arsenious acid, and benzoic acid in the weight proportions of 100, 600, 25, 2 and 7 parts respectively and in the order named; the casein being first soaked in the water until thoroughly swelled, when the calcium hydrate is added and the mixture gently stirred until complete solution is obtained; the arsenious acid is then added and the mixture permitted to stand until completely liquefied, when powdered benzoic acid is added under gentle stirring.

9. A method of manufacturing porous concrete consisting in first preparing a cement slurry; second, preparing separately a frothing compound; third, mixing together the slurry and the frothing compound in proportions of 100 to 60; fourth, forcing a gas into the mixture, and, lastly, pouring the mixture into suitable molds to set and harden; the frothing compound comprising casein, water, calcium hydrate, arsenious acid, benzoic acid, boracic acid, colloidal tungstic acid, crystals of beta naphthol and diatomaceous earth solution; the casein being first soaked in the water until thoroughly swelled, when the calcium hydrate is added and the mixture gently stirred until complete solution is obtained; the arsenious acid is then added and the mixture permitted to stand until completely liquefied, when powdered benzoic acid is added under gentle stirring; one part of diatomaceous earth is then dissolved separately in eight parts of water and thirty parts of this earth solution are then thoroughly mixed with colloidal tungstic acid and beta naphthol, whereupon the whole is added to the rest of the frothing compound.

10. A method of manufacturing porous concrete consisting in first preparing a cement slurry; second, preparing separately a frothing compound; third, mixing together the slurry and the frothing compound in proportions of 100 to 60; fourth, forcing a gas into the mixture, and, lastly, pouring the mixture into suitable molds to set and harden; the frothing compound comprising casein, water, calcium hydrate, arsenious acid, benzoic acid, boracic acid, colloidal tungstic acid, crystals of beta naphthol and diatomaceous earth solution; the casein being first soaked in the water until thoroughly swelled, when the calcium hydrate is added and the mixture gently stirred until complete solution is obtained; the arsenious acid is then added and the mixture permitted to stand until completely liquefied, when powdered benzoic acid is added under gentle stirring; one part of diatomaceous earth is then dissolved separately in eight parts of water and thirty parts of this earth solution are then thoroughly mixed with colloidal tungstic acid and beta naphthol, whereupon the whole is added to the rest of the frothing compound; after diluting one part of the thus obtained frothing compound in 50 parts of water, sixty parts of said diluted frothing compound or solution is mixed with 100 parts of the slurry.

In testimony whereof I affix my signature.

JOHN A. RICE.